Feb. 26, 1935.　　A. H. NELSON　　1,992,714
DICING MACHINE
Filed July 3, 1933　　4 Sheets-Sheet 1
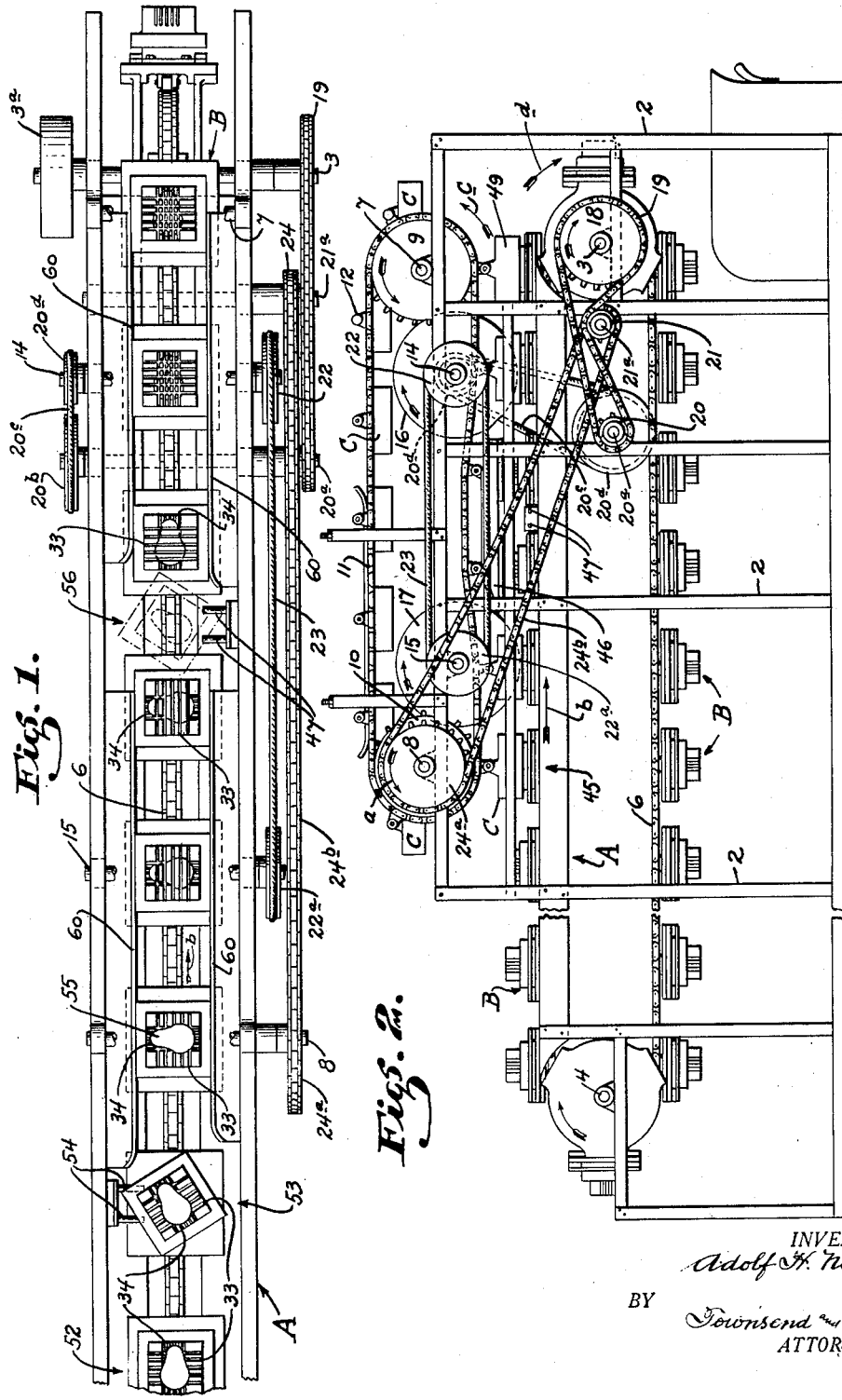
INVENTOR.
Adolf H. Nelson.
BY Townsend and Loftus
ATTORNEYS.

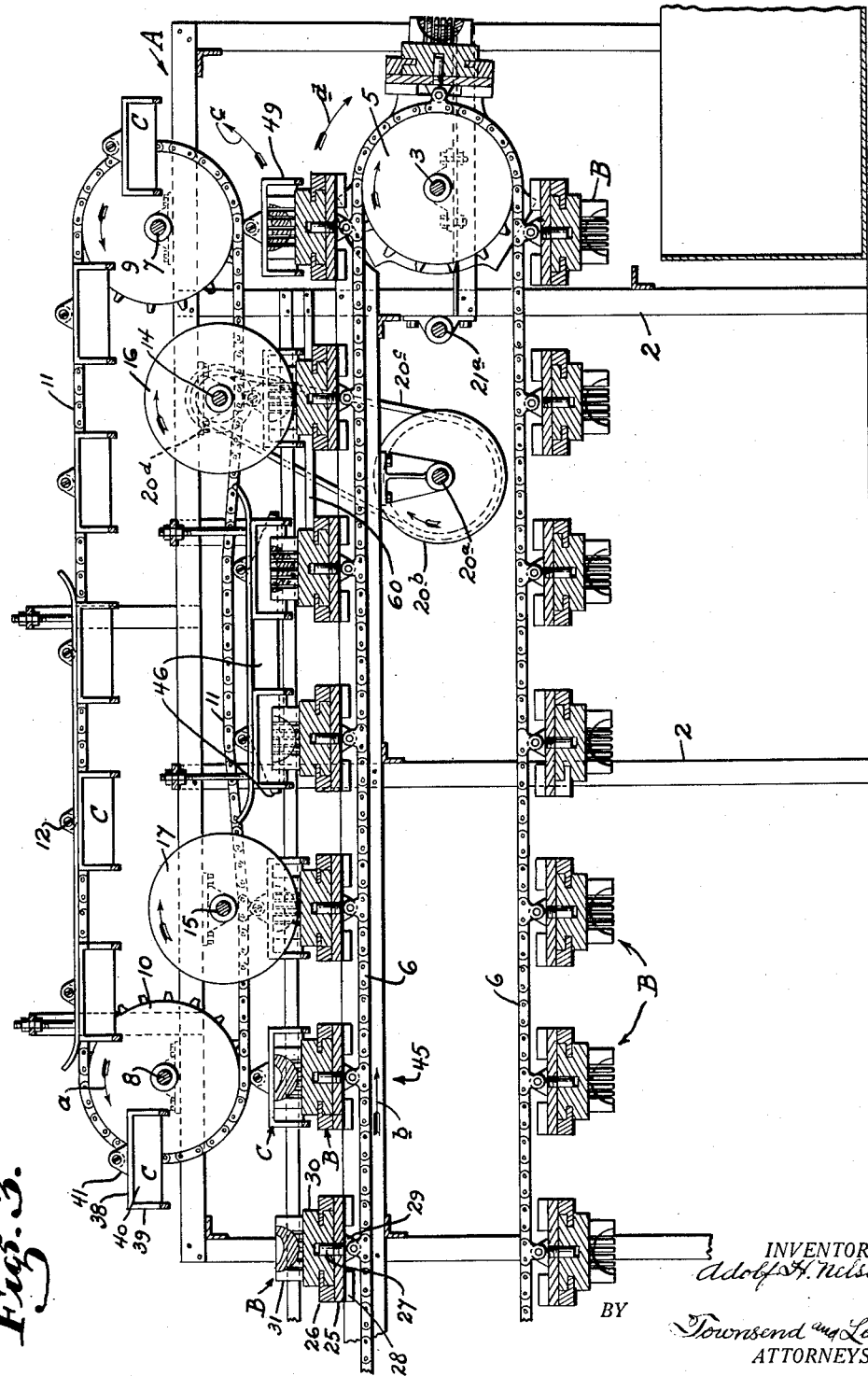

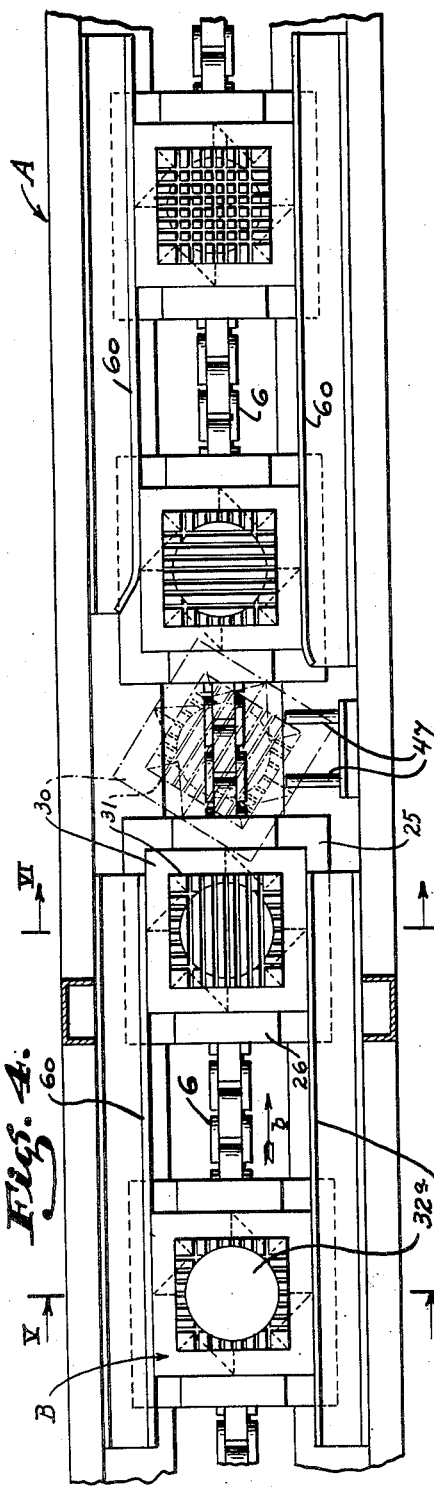
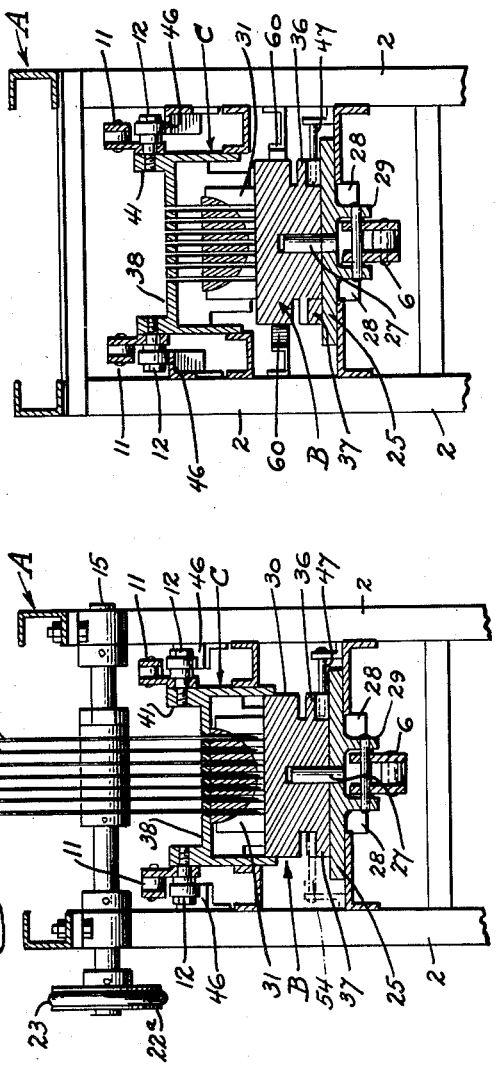

Feb. 26, 1935. A. H. NELSON 1,992,714
DICING MACHINE
Filed July 3, 1933 4 Sheets-Sheet 4
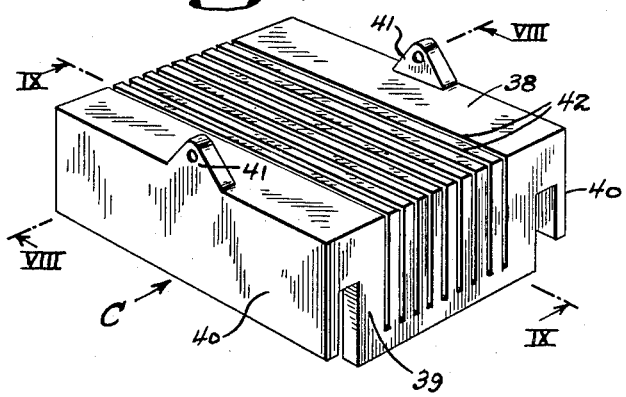
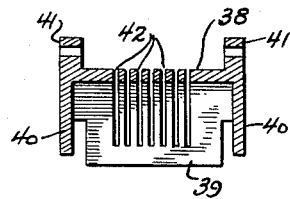
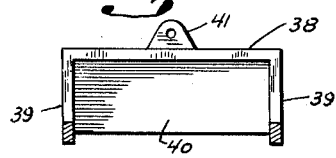
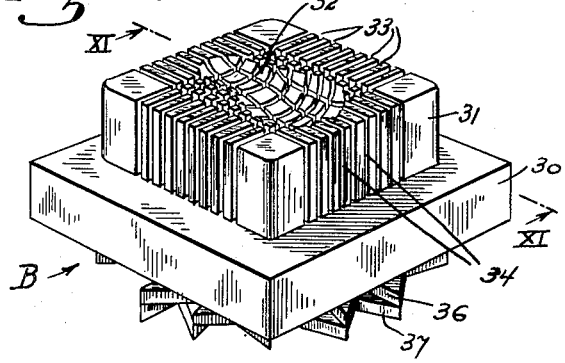
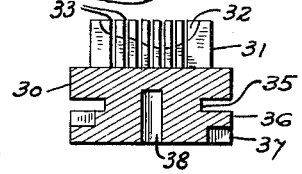
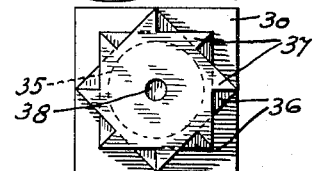
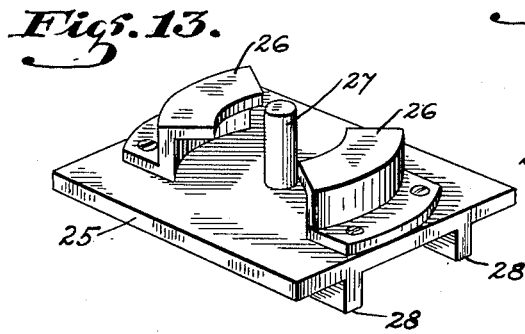
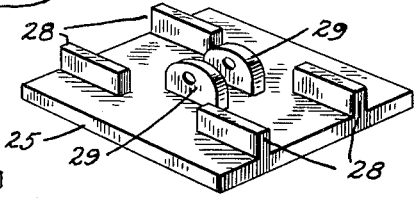
INVENTOR.
Adolf H. Nelson.
BY Townsend and Loftus.
ATTORNEYS.

Patented Feb. 26, 1935

1,992,714

UNITED STATES PATENT OFFICE 1,992,714

DICING MACHINE

Adolf H. Nelson, San Francisco, Calif.

Application July 3, 1933, Serial No. 678,903

5 Claims. (Cl. 146—98)

This invention relates to a machine for dicing or slicing fruits, vegetables, and other materials.

A considerable portion of fruit canned or packed by the fruit canners throughout the country is being placed on the market in diced or sliced form under the name of "Fruit salads", "Fruit cocktails", etc.

The dicing or slicing of fruit for this purpose has proved a difficult problem first because the methods of cutting or slicing employed have a tendency to partially crush the fruit and also causes a considerable loss of the juice content, and secondly there is entirely too much undersized material produced and this causes a considerable loss in the form of waste.

The object of the present invention is to generally improve and simplify the construction and operation of machines for dicing and slicing fruits, vegetables, and the like; to provide a machine for cutting fruit, etc., in which crushing, juice loss, and waste is substantially eliminated; to provide a machine of the character described in which the fruit to be diced or cut is delivered to the machine in half sections and each section is cut one at a time, this in contradistinction to machines where large quantities of fruit are cut or acted upon during each cutting operation; to provide a machine in which holders are provided for each half section of fruit, said holders being slotted longitudinally and transversely to permit the fruit to be passed through one set of knives which cuts the fruit longitudinally after which the holder and fruit is rotated ninety degrees and passed through a second set of knives when the fruit is cut transversely; to provide means for firmly securing the fruit in the holders so as to insure clean cuts during the successive cutting operations; and further, to provide a machine of the character described which is simple and compact in construction and automatic in operation.

The machine is shown by way of illustration in the accompanying drawings, in which—

Fig. 1 is a diagrammatic plan view of the machine.

Fig. 2 is a side elevation of the machine.

Fig. 3 is an enlarged side elevation similar to Fig. 2, said side elevation being partially in section.

Fig. 4 is an enlarged plan view of a portion of the machine showing the turning mechanism employed.

Fig. 5 is a cross section taken on line V—V of Fig. 4 said cross section also showing the cross shaft 15, the cutting knives 17 and the pulleys whereby the shafts and knives are driven.

Fig. 6 is a cross section taken on line VI—VI of Fig. 4.

Fig. 7 is a perspective view of one of the cover members.

Fig. 8 is a cross section on a reduced scale taken on line VIII—VIII of Fig. 7.

Fig. 9 is a longitudinal vertical section on a reduced scale taken on line IX—IX of Fig. 7.

Fig. 10 is a perspective view of one of the holders.

Fig. 11 is a central vertical cross section on a reduced scale taken on line XI—XI of Fig. 10.

Fig. 12 is a bottom plan view on a reduced scale of the holder.

Fig. 13 is a perspective view of the upper face of the plate upon which the holder is rotatably mounted.

Fig. 14 is a perspective view of the lower side of the plate shown in Fig. 13.

Referring to the drawings in detail, and particularly Fig. 2, A indicates a main frame supported by uprights or standards 2—2. Journaled crosswise of the frame at opposite ends thereof are shafts 3 and 4, the shaft 4 being positioned at the forward or feeding end of the machine and shaft 3 at the rear or discharge end. Shaft 3 is a drive shaft and is driven from any suitable source through a pulley 3a. Secured on the shaft centrally of the frame is a sprocket gear 5, see Fig. 3. Similarly secured on the shaft 4 is a sprocket gear and carried by said gears is an endless sprocket chain 6, to which is secured a plurality of holders generally indicated at B.

Journaled in the frame and extending crosswise thereof at a point above the shafts 3 and 4 are a pair of shafts 7 and 8, and secured on the respective shafts are pairs of sprocket gears 9 and 10, which carry a pair of sprocket chains 11. Secured to the chains are pins 12 and pivoted on the pins between the chains are cover members generally indicated at C, which will hereinafter be described.

Journaled in the frame and extending crosswise thereof at a point below the shafts 7 and 8 are a pair of shafts 14 and 15, and secured on the respective shafts are a plurality of circular cutting discs 16 and 17.

It was previously stated that shaft 3 was the drive shaft of the machine and was driven through means of a pulley 3a. On the opposite end of the drive shaft, see Figs. 1 and 2, is a sprocket gear 18 which carries an endless chain 19. This chain is wreathed over sprockets 20 and 21 and drives the shafts 20a and 21a on which they are secured. Shaft 20a extends crosswise of the main frame and its opposite end carries a pulley 20b. This carries a belt 20c and the belt is passed over a pulley 20d secured on shaft 14. The opposite end of shaft 14 carries a pulley 22 and a similar pulley 22a is secured on shaft 15, and as these pulleys are connected by a belt 23, power is transmitted to continuously rotate the shafts 14 and 15 and the circular knife discs secured thereon. The cross shaft 21a, which is driven by the chain 19, carries a second sprocket gear indicated at 24. A sprocket gear 24a is secured on shaft 8 and a chain 24b is wreathed around the sprocket gears 24 and 24a, causing power to be transmitted to drive shaft 8 and through the sprocket chains 11 to drive the shaft 7. The direction of rotation of the several shafts driven from the drive shaft 3 is indicated by the arrows, see Fig. 2, and it will there be noted that the chains 11 rotate in the direction of arrow a, maintaining the upper side of the chains taut and the lower side of the chains slack, this being important as the covers C are suspended between the chains and will accordingly be free to rest on top of the fruit placed in the holders by gravitational action, as will hereinafter be described. The main chain 6 to which the holders B are secured travels in the direction of arrow b. The covers C and holders B, accordingly, travel in the same direction and as they travel at the same speed the covers are automatically applied to the respective holders after the fruit has been placed therein, and the covers will remain on top of the fruit to secure the same in the holders while the holders and covers pass through the knives 17 and 16, thereafter the covers are removed by passing around the sprockets 9, the holders at the same time passing downwardly around the sprockets 5 where they assume an inverted or upside down position permitting the fruit which has been sliced or diced to be discharged by gravity.

The holders in which the fruit is placed are best shown in Figs. 10 to 14, inclusive. In actual practice there will be a dozen or more holders attached to the chain 6 but as they are identical in construction the description of one will suffice. Each holder consists of a plate 25, see Figs. 13 and 14, which is rectangular in shape. The upper face of this plate is provided with a pair of segmental shaped bearing flanges 26 and with a central pin 27. The lower face of each plate 25 is provided with guide lugs 28 at the front and rear ends and with central lugs 29, which form an attachment to the chain 6. The plate 25 merely functions as a support and a driving member for the holders, one of which is shown in Fig. 10. The holder consists of a base block 30 which is square in shape and in the top of which is formed a second block 31. This block is provided with a central depression 32 to receive the fruit or other material to be cut, and the block 31 is furthermore slotted longitudinally and transversely as shown at 33 and 34. On the lower face of the plate 30 is formed a hub member 35 and on the face of the hub is formed or secured a pair of ratchet gears 36 and 37, the hub being centrally recessed or drilled, as shown at 38, to permit the holder as a whole to be placed on the pin 27, and when so placed, to be secured against removal by the segmental bearing lugs 26. These lugs engage opposite sides of the hub 35 and the face of the ratchet gear 36 and thereby secures the holder against endwise removal from the pin 27 but at the same time permitting rotation of the holder about the pin 27.

A plurality of cover members are carried by the chains 11 but the cover members are identical in construction and operation and the description of one will suffice. By referring to Fig. 7 it will be noted that the cover members are substantially square in shape to conform to the shape of the plate 30 of the holder shown in Fig. 10. The cover member consists of a top plate 38, end plates 39, and side plates 40. The end and side plates 39 and 40 will embrace the ends and side of the plate 30 when the cover is brought into proper position with relation to a holder. The cover, as previously stated, is pivotally mounted on pins connecting the chains 11 and these pins extend through lugs 41 formed on the cover. The cover is longitudinally slotted, as shown at 42, but it is not transversely slotted as it is not subjected to rotation.

The depression 32, see Fig. 10, formed in the top of the block portion 31 of the holder may conform to the particular type of fruit to be sliced or cut. In Fig. 10, the depression is shaped to conform to that of a half of a pear. In Fig. 4 the depressions are shown to be circular in shape, as indicated at 32a, such depressions being provided for fruits like peaches, apricots, and the like. The fruit to be diced or sliced is preferably cut into halves and it is placed by hand or by any suitable feeding means in the depressions of the holders as they pass by operators placed at the forward end of the machine, see Fig. 2. If fruit like peaches, apricots, or the like, is being handled, holders having circular shaped depressions will be employed and it may here be stated that each holder will only be rotated one-quarter of a revolution during each complete rotation of the chain 6 but, if pear shaped fruit, or the like, is to be diced or sliced, holders such as shown in Figs. 1 and 10 will be employed and in that case each holder will be rotated first one-quarter of a revolution in one direction and the one-quarter of a revolution back in the opposite direction during each complete rotation of the chain 6. The purpose of such back and forth rotation of the holders will hereinafter be described.

Supposing the machine to be running or in operation and that peaches are being diced or sliced, one or more operators will be placed at the forward end of the machine, see Fig. 2, and each operator will place halved peaches in the circular depressions of the holders as they pass by. When the holders approach the position shown at 45, a cover B will travel downwardly and will align with the holder at the point 45. The holder and cover will then travel together and as the chains 11 between the sprockets 9 and 10 are slack at this point the covers can rest by gravity on top of the fruit placed in the holder and the covers will adjust themselves vertically to fruit of different size and thickness, the weight of the cover being, however, sufficient to hold the fruit firmly in the holders during the successive cutting operations. After the cover has been applied at the point 45, continued movement of the cover and holder will cause the same to pass through the circular disc knives 17. Such movement is permitted as the cover is longitudinally slotted, as shown at 42, and the holder or block 31 is longitudinally slotted, as indicated at 33. The knives pass through these slots as they are parallel to the travel of the covers and holders and the fruit is thereby cut longitudinally into a series of strips. The moment the holder and cover has passed through the knife 17, rollers at the ends of the rods supporting the covers engage a cam track indicated at 46, see Fig. 3. The covers are here raised to clear the holders and during the period when clearance is maintained between the covers and holders a rotary movement of a quarter of a revolution is imparted to the holders. This is accomplished by employing a pair of pins, such as indicated at 47, see Fig. 4. The first pin will engage one tooth of the sprocket 37 and the second pin 47 will engage a second tooth of the sprocket 37. Such engagement rotates the holder a quarter of a revolution, or ninety degrees, and thereby brings the lateral slots 34 into alignment with the circular disc knives and with the slots in the cover. The moment rotation of the holder has taken place cam 46 ends, the covers are again dropped into position and they will then pass through the knives indicated at 16. The fruit which has previously been longitudinally cut into strips will there be crosscut and the operation of slicing or dicing the fruit is thus completed. The covers leave the holders at the point indicated at 49, the covers traveling in an upward direction, as indicated by the arrow c, and the holders traveling in a downward direction as indicated by the arrow d, and as the holders reach an upside down position the sliced or diced fruit is naturally discharged by gravity and may be removed in any manner desired.

The operation of slicing or dicing pear shaped fruit, or the like, is best illustrated in Fig. 1. In this instance the fruit is first cross cut and then cut longitudinally. The pears are placed in the pear shaped depressions at a point indicated at 52, or at a point forwardly thereof. When a holder reaches the position indicated at 53 the ratchet gears below the same are successively engaged by a pair of pins 54 and the holder is thus rotated a quarter of a revolution or ninety degrees and assumes the position shown at 55. At this point it passes through the knives 17 and is cross cut. It travels in this position until it reaches the point indicated at 56 where the ratchet gears are engaged by the pins 47. These are on the opposite side of the frame from the pins 54, and when they engage the ratchet gears, the holder will be rotated in a reverse direction or back to its normal position with its longitudinal axis in alignment with the line of travel. The longitudinal slots in the holders will now align with the knives 16 and in passing therethrough the fruit is longitudinally cut and the cutting operation is completed, after which the covers are automatically removed and the fruit discharged by inversion of the holders.

It is obvious that correct alignment must be maintained between the slotted covers and holders and also between the slotted holders and the knives through or between which they successively pass. To maintain alignment between the covers and the holders the covers are permitted to drop downwardly and over the plates 30 of the holders. This insures alignment between the slots 42 and the blocks 31 of the holders and in order to insure alignment between the holders and the knives between which they pass guide tracks 60 are placed on opposite sides of the frame to engage the sides of the blocks 30. These guide tracks are interrupted at the points 54 and 56 where the turning of the holders take place but they will otherwise extend from end to end of the frame so as to insure perfect guiding of the holders and the covers as they pass through or between the knives.

By cutting fruit in the manner described it is possible to employ circular disc shaped cutters which can be rotated at a very high speed. Such cutters give a shearing slicing cut and as such produce a clean cut with the least removal of fruit possible and without any crushing effect which has a tendency to liberate juices. An ideal cutting operation is thus obtained. Furthermore, it should be noted that the cutters operate only on a half section of fruit at a time. This is also important as common practice is to cut a large mass of fruit with one operation. Such cutting has been found to be undesirable as there is a tendency to crush the fruit during the cutting operation thus mutilating the fruit and liberating too much of the juice content. This is entirely eliminated in the present instance as only a half section of fruit is subjected to a cutting operation at one time and it is longitudinally cut by one set of knives and then transversely cut by another set of knives, the object being to exert the least pressure possible during each cutting operation so as to produce the cleanest cut possible and to reduce the loss of juice content. In fact, the cutting operation has been found so efficient with a machine of this character that soft canned fruit can be readily handled without crushing or mutilating the fruit. It would appear that inasmuch as only half sections of fruit can be cut one at a time that the capacity of the machine would be very small. This, however, is not the case as the holders travel with considerable speed through the knives, thus cutting one half section of fruit after another in rapid succession. A large capacity can in this manner be insured as the traveling speed of the holders receiving the fruit can be speeded up to a point where it is difficult for the operators to feed or supply the same with fruit.

All motions employed in this machine are continuous and most of them rotary. This is also important as it insures greater speed. All parts are accessible for cleaning, inspection and repair. The construction is simple and compact and all operations are automatic except that of placing the fruit in the holders. An automatic feeder may be employed but it is not disclosed in the present instance, and while this and other features are more or less specifically described, I wish it understood that various changes may be resorted to within the scope of the appended claims. Similarly, that the materials and finish of the several parts employed may be such as the manufacturer may decide, or varying conditions or uses may demand.

Having thus described my invention, what I claim and desire to secure by Letters Patent is—

1. In a machine of the character described a main frame, an endless chain extending longitudinally thereof, means for transmitting continuous movement to the chain, a plurality of holders secured to the chain and rotatable with relation thereto, said holders having depressions formed therein for the reception of material to be cut, a plurality of cutters mounted above the holders carried by the chain and disposed in alignment therewith, said holders being longitudinally and laterally slotted, means for automatically rotating each holder as it is being moved by the chain so that it will present one set of slots to one cutter and another set of slots to the second cutter, thereby first cutting the material supported therein in longitudinal strips and then crosscutting the material so as to form a diced product, a pair of endless sprocket chains disposed above the first-named sprocket chain and the holders carried thereby, cover members pivotally disposed between said chains and adapted to cover and secure material placed in the holders during the successive cutting operations, and means for raising the cover members out of engagement with the holders during rotation of the holders.

2. In a machine of the character described a main frame, an endless chain extending longitudinally thereof, means for transmitting continuous movement to the chain, a plurality of holders secured to the chain and rotatable with relation thereto, said holders having depressions formed therein for the reception of material to be cut, a plurality of cutters mounted above the holders carried by the chain and disposed in alignment therewith, said holders being longitudinally and laterally slotted, means for automatically rotating each holder as it is being moved by the chain so that it will present one set of slots to one cutter and another set of slots to the second cutter, thereby first cutting the material supported therein in longitudinal strips and then crosscutting the material so as to form a diced product, a pair of endless sprocket chains disposed above the first-named sprocket chain and the holders carried thereby, cover members pivotally disposed between said chains and adapted to cover and secure material placed in the holders during the successive cutting operations, means for raising the cover members out of engagement with the holders during rotation of the holders, guide means engageable with the holders before and after rotation of the holders, and guide means engageable with the covers to insure positive alignment between the covers and the holders.

3. In a machine of the character described a main frame, an endless chain extending longitudinally thereof, means for transmitting continuous movement to the chain, a plurality of holders secured to the chain and rotatable with relation thereto, said holders having depressions formed therein for the reception of material to be cut, a plurality of cutters mounted above the holders carried by the chain and disposed in alignment therewith, said holders being longitudinally and laterally slotted, means for automatically rotating each holder as it is being moved by the chain so that it will present one set of slots to one cutter and another set of slots to the second cutter, thereby first cutting the material supported therein in longitudinal strips and then crosscutting the material so as to form a diced product, a pair of endless sprocket chains disposed above the first-named sprocket chain and the holders carried thereby, cover members pivotally disposed between said chains and adapted to cover and secure material placed in the holders during the successive cutting operations, means for raising the cover members out of engagement with the holders during rotation of the holders, guide means engageable with the holders before and after rotation of the holders, guide means engageable with the covers to insure positive alignment between the covers and the holders, and other guide means for securing the covers against swinging about their pivots when raised above the holders during rotation of the holders.

4. In a machine of the character described a main frame, an endless chain extending longitudinally thereof, means for transmitting continuous movement to the chain, a plurality of holders secured to the chain and rotatable with relation thereto, said holders having depressions formed therein for the reception of material to be cut, a plurality of cutters mounted above the holders carried by the chain and disposed in alignment therewith, said holders being longitudinally and laterally slotted, means for automatically rotating each holder as it is being moved by the chain so that it will present one set of slots to one cutter and another set of slots to the second cutter, thereby first cutting the material supported therein in longitudinal strips and then crosscutting the material so as to form a diced product, a pair of endless sprocket chains disposed above the first-named sprocket chain and the holders carried thereby, cover members pivotally disposed between said chains and adapted to cover and secure material placed in the holders during the successive cutting operations, means for raising the cover members out of engagement with the holders during rotation of the holders, said cover members telescoping with relation to the holders, and means securing the holders and covers against turning movement with relation to each other when telescoped.

5. In a machine of the character described a main frame, an endless chain extending longitudinally thereof, means for transmitting continuous movement to the chain, a plurality of holders secured to the chain and rotatable with relation thereto, said holders having depressions formed therein for the reception of material to be cut, a plurality of cutters mounted above the holders carried by the chain and disposed in alignment therewith, said holders being longitudinally and laterally slotted, means for automatically rotating each holder as it is being moved by the chain so that it will present one set of slots to one cutter and another set of slots to the second cutter, thereby first cutting the material supported therein in longitudinal strips and then crosscutting the material so as to form a diced product, a pair of endless sprocket chains disposed above the first-named sprocket chain and the holders carried thereby, cover members pivotally disposed between said chains and adapted to cover and secure material placed in the holders during the successive cutting operations, means for raising the cover members out of engagement with the holders during rotation of the holders, and means for automatically reversing the position of the holders after the second cutting operation to insure return of the holders to a predetermined position.

ADOLF H. NELSON.